United States Patent
Al-Salam

(10) Patent No.: US 10,704,702 B2
(45) Date of Patent: Jul. 7, 2020

(54) CHOKE VALVE WITH INTERNAL SLEEVE FOR EROSION PROTECTION

(71) Applicant: Saudi Arabian Oil Company, Dhahran (SA)

(72) Inventor: Abdullah Ali Al-Salam, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 19 days.

(21) Appl. No.: 15/995,293

(22) Filed: Jun. 1, 2018

(65) Prior Publication Data

US 2019/0368625 A1 Dec. 5, 2019

(51) Int. Cl.
| | |
|---|---|
| *F16K 25/04* | (2006.01) |
| *F16K 5/20* | (2006.01) |
| *F16K 3/26* | (2006.01) |
| *E21B 34/02* | (2006.01) |

(52) U.S. Cl.
CPC .............. *F16K 25/04* (2013.01); *E21B 34/02* (2013.01); *F16K 5/205* (2013.01); *F16K 3/265* (2013.01); *Y10T 137/773* (2015.04)

(58) Field of Classification Search
CPC .......... F16K 25/04; F16K 5/205; F16K 3/265; E21B 34/02
See application file for complete search history.

(56) References Cited

U.S. PATENT DOCUMENTS

| | | | |
|---|---|---|---|
| 3,952,759 A | 4/1976 | Ottenstein | |
| 4,136,709 A | 1/1979 | Rogers et al. | |
| 4,461,316 A | 7/1984 | Cove et al. | |
| 4,569,370 A | 2/1986 | Will | |
| 4,638,833 A | 1/1987 | Wolcott, II | |
| 4,735,229 A | 4/1988 | Lancaster | |
| 4,874,007 A | 10/1989 | Taylor | |
| 5,671,775 A | 9/1997 | Miller | |
| 6,926,032 B2 * | 8/2005 | Nawaz | F16K 47/04 137/625.33 |
| 7,940,189 B2 | 5/2011 | Brown | |
| 8,490,652 B2 * | 7/2013 | Bohaychuk | F16K 3/24 137/375 |
| 8,528,585 B2 * | 9/2013 | McGuire | F16L 37/088 137/315.01 |
| 8,850,872 B2 * | 10/2014 | Jarvie | G01M 3/2892 137/409 |
| 8,985,143 B2 * | 3/2015 | Forte, Jr. | F01D 17/02 137/557 |
| 2015/0027557 A1 | 1/2015 | Crawford | |
| 2016/0223089 A1 | 8/2016 | Nijland | |

FOREIGN PATENT DOCUMENTS

EP 0637713 2/1995

OTHER PUBLICATIONS

International Search Report and Written Opinion issued in International Application No. PCT/US2019/032679 dated Jul. 23, 2019, 14 pages.

* cited by examiner

*Primary Examiner* — Jessica Cahill
(74) *Attorney, Agent, or Firm* — Fish & Richardson P.C.

(57) ABSTRACT

An assembly and method for a choke valve body having a choke valve to control flow of fluids. A sleeve positioned in and attached to the choke valve body to flow the fluids through an inner sleeve region internal to the sleeve instead of an outer sleeve region external to the sleeve.

20 Claims, 3 Drawing Sheets

CHOKE VALVE WITH INTERNAL SLEEVE FOR EROSION PROTECTION

TECHNICAL FIELD

This disclosure relates to controlling fluid flow through flow lines, for example, using valves.

BACKGROUND

Flow lines carry fluids over long distances. The fluids can include multiple phases including liquids, gases and suspended solids. For example, the fluids can include hydrocarbons extracted from a hydrocarbon reservoir in a subterranean zone via a wellbore. In some instances, the hydrocarbons can include solid particulates, for example, sand or other debris, that flowed from the subterranean zone via the wellbore to the surface together with the hydrocarbons.

Flow lines implement valves to control the flow of fluid. In instances in which the flowing fluids include solid particulates, the particulates can erode internal regions of the valves over time. Such erosions, left untreated, can damage, for example, rupture, the flow lines causing leaks.

SUMMARY

This specification describes technologies relating to choke valves with internal sleeves for erosion protection.

An aspect relates to a choke valve assembly including an inlet body configured to receive fluids flowed through an upstream flow line, and an outlet body fluidically coupled to the inlet body, the outlet body configured to discharge fluids received at the inlet body out of the choke valve assembly into a downstream flow line. The assembly includes a choke valve body positioned between and attached to each of the inlet body and the outlet body, the choke valve body having a choke valve configured to be opened or closed to control flow of the fluids from the inlet body to the outlet body. In addition, the assembly includes a sleeve positioned in and attached to an inner region defined by the choke valve body, the sleeve defining an inner sleeve region internal to the sleeve and an outer sleeve region external to the sleeve and internal to the inner region of the choke valve body. The sleeve is configured to flow the fluids from the inlet body through the inner sleeve region instead of the outer sleeve region.

Another aspect relates to a method including receiving, from an upstream flow line, fluids at an inlet body of a choke valve assembly, the inlet body fluidically coupled to an outlet body of the choke valve assembly, the outlet body configured to flow the fluids to a downstream flow line. Further, the method includes forming, by a sleeve positioned in and attached to a choke valve body positioned between the inlet body and the outlet body, an inner region internal to the sleeve and an outer region external to the sleeve and internal to the choke valve body, the choke valve body comprising a choke valve configured to be open or closed to control flow of the fluids from the inlet body to the outlet body. The method also includes flowing, by the sleeve and in response to the choke valve being open, the fluids received at the inlet body through the inner region instead of through the outer region and to the outlet body.

Yet another aspect relates to a hydrocarbon flow line assembly having an upstream flow line configured to flow well fluids comprising hydrocarbons extracted from a hydrocarbon reservoir in a subterranean zone, and a choke valve assembly downstream of the upstream flow line, the choke valve assembly fluidically coupled to an outlet of the upstream flow line to receive the well fluids from the upstream flow line. The choke valve assembly includes a sleeve positioned in and attached to an inner region of the choke valve assembly, the sleeve defining an inner sleeve region internal to the sleeve and an outer sleeve region external to the sleeve and internal to the inner region of the choke valve assembly. The sleeve is configured to flow the fluids from the inlet body through the inner sleeve region instead of the outer sleeve region. The hydrocarbon flow assembly also includes a downstream flow line downstream of the choke valve assembly and configured to receive the well fluids from an outlet of the choke valve assembly.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Choke valve assemblies are used to control flow of fluids through flow lines. The fluids can include hydrocarbons extracted from a hydrocarbon reservoir. Such fluids can include liquid, gas and solid particulates, for example, sand particles or other solid particulates from the hydrocarbon reservoir. The outlet portions of the choke valve assemblies experience high fluid velocities due to the volumetric flow rates of the fluids flowed through the flow lines. The outlet portions experience pin-hole leaks resulting from erosion caused by the solid particles. In the case of hydrocarbon carrying flow lines, such erosion can result in oil spills which can be catastrophic.

This disclosure describes a modified choke valve assembly that includes an internal sleeve within the choke valve assembly. As described later, the internal sleeve defines an inner sleeve region through which the flow line fluid is flowed and an outer sleeve region that is external to the sleeve and internal to the choke valve assembly. The outer sleeve region defines a void space in which the fluidic pressure is sensed. If the fluidic pressure in the outer sleeve region fails to satisfy a fluidic pressure threshold (for example, is greater than the fluidic pressure threshold), that indicates that the internal sleeve has been eroded. In response, flow through the flow lines can be stopped and the internal sleeve of the choke valve assembly can be replaced without needing to replace the entire choke valve assembly. Alternatively or in addition, in response to detecting that the internal sleeve has eroded, an emergency shutdown (ESD) system can be activated to shut off flow through the flow lines to prevent any spillage while the sleeve is being replaced.

In some implementations, the sleeve is attached in or near an outlet body of the choke valve assembly. Because any erosion is absorbed by the sleeve, the choke valve body is protected, thereby extending its life. By sensing the fluidic pressure in the void space defined by the outer sleeve region, a failure (such as rupture) of the sleeve due to erosion by solid particulates can be detected before the choke valve assembly itself fails. In this manner, leaks or spills can be prevented and the associated damage avoided. Therefore, asset integrity and reliability may be enhanced, decreasing interruption of oil/gas production and thus increasing production, and also reducing undesired release of oil/gas to the environment, and so on.

Figure 1:
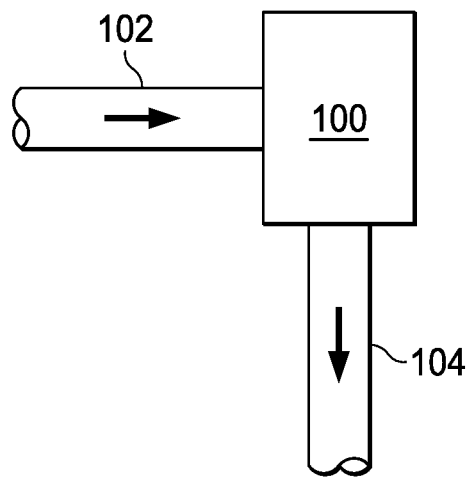
FIG. 1 is a schematic diagram of example flow lines fluidically coupled by a valve assembly.

FIG. 1 is a schematic diagram of example flow lines fluidically coupled by a valve assembly. A choke valve assembly 100 controls flow of the fluids through the flow lines, in particular, an upstream flow line 102 upstream of the choke valve assembly 100 and a downstream flow line 104 downstream of the choke valve assembly 100. In some implementations, the flow lines can carry hydrocarbons (for example, oil, gas, or combinations of them) extracted from a hydrocarbon reservoir in a subterranean zone via a wellbore. The fluids in the flow lines can carry solid particulates, for example, sand or well debris that flowed into the flow lines from the hydrocarbon reservoir via the well.

The choke valve assembly 100 is described in the context of hydrocarbons received from a wellbore or carried through a flow line. The choke valve assembly 100 can be implemented in any flow line through which fluids that carry solid particulates. Specifically, the solid particulates, for example, sand, rock, or other solid particulates, can be of a size and toughness that can erode inner regions of the choke valve assembly when flowed through the choke valve assembly. Also, the choke valve assembly 100 is described in the context of an upstream flow line 102 that is substantially perpendicular to a downstream flow line 102 such that the fluid flow path turns by substantially ninety degrees. As used in this disclosure, the term "substantially" represents a variance from a numerical value by up to and including around 5%. For example, by "substantially perpendicular," it is meant that an angle between the upstream flow line 102 and the downstream flow line 104 can range between 85 degrees and 95 degrees. In alternative implementations, the choke valve assembly 100 can be implemented when the upstream flow line 102 and the downstream flow line 104 are at different angles from that shown in FIG. 1. For example, the upstream flow line 102 and the downstream flow line 104 can be co-axial with the choke valve assembly 100 positioned in between. Indeed, the choke valve assembly 100 may accommodate or incorporate various arrangements of the flow lines 102 and 104. Again, in some examples, the angle for the choke valve between the upstream line 102 and downstream line 104 is about 90 degrees.

Figure 2:
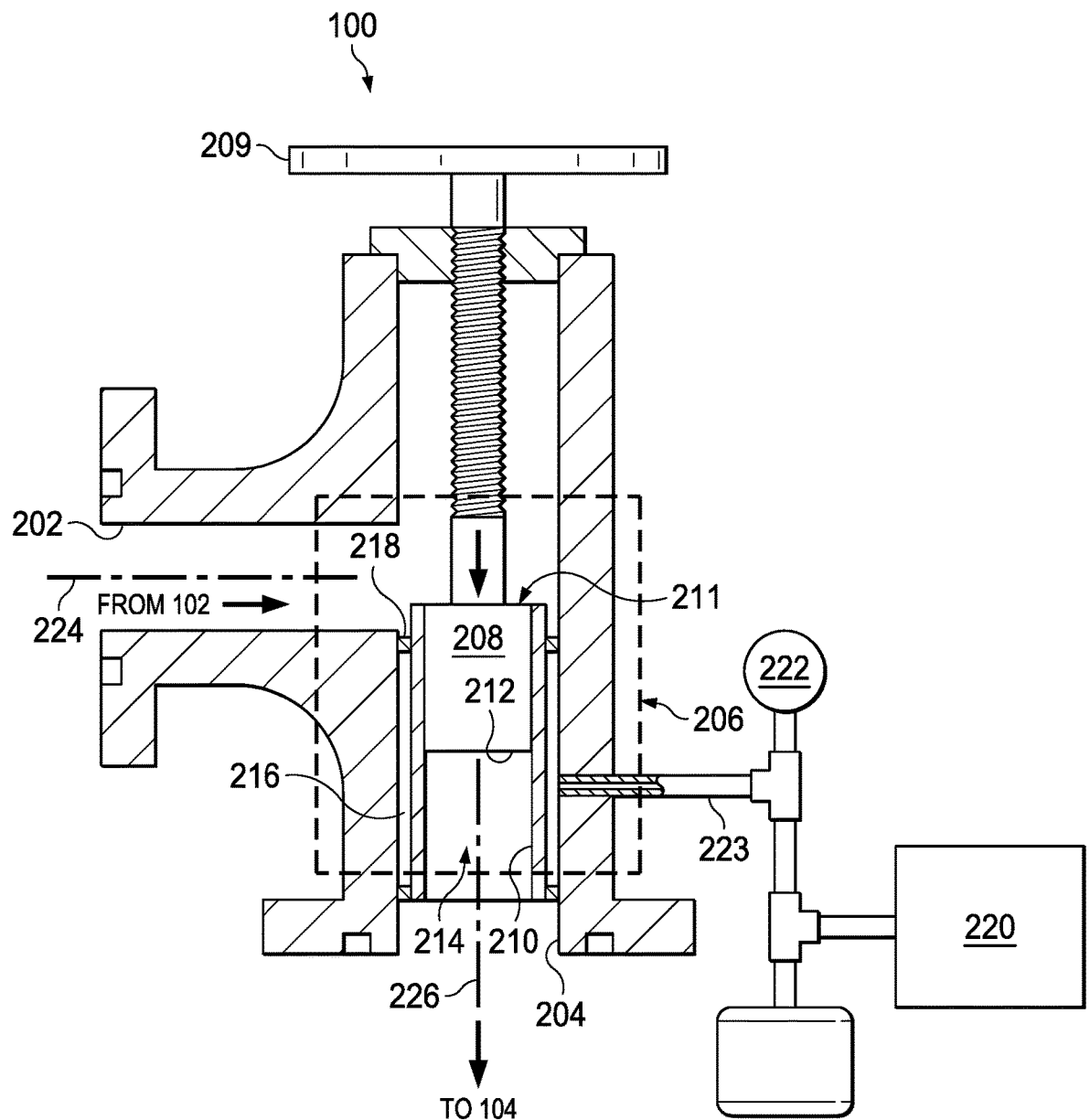
FIG. 2 is a schematic diagram of an example choke valve assembly in a closed state.

FIG. 2 is a schematic diagram of an example choke valve assembly 100 in a closed state. The choke valve assembly 100 includes an inlet body 202 that can receive fluids flowed through an upstream flow line, for example, the upstream flow line 102 (FIG. 1). The inlet body 202 can include a hollow tubular member that can be fluidically interfaced with and seal to an outlet of the upstream flow line 102, for example, via a coupling or other interface structure. The choke valve assembly 100 includes an outlet body 204 fluidically coupled to the inlet body 202. The outlet body 204 can discharge fluids received at the inlet body 202 out of the choke valve assembly 100 into a downstream flow line, for example, the downstream flow line 104. Like the inlet body 202, the outlet body 204 can include a hollow tubular member that can be fluidically interfaced with and seal to an inlet of the downstream flow line 104, for example, via a coupling or other interface structure. In some implementations, a longitudinal axis 224 of the inlet body 202 can be substantially perpendicular to a longitudinal axis 226 of the outlet body 204 such that the fluids entering the choke valve assembly 100 via the inlet body 202 are turned by substantially ninety degrees in the outlet body 204.

A choke valve body 206 is positioned between and attached to each of the inlet body 202 and the outlet body 204. The choke valve body 206 includes a choke valve 208 that can be opened or closed to control flow of the fluids from the inlet body 202 to the outlet body 204. In FIG. 2, the choke valve 208 is shown in a closed state. That is, the choke valve stem 211, which can be moved between open and closed states, for example, by rotating the hand wheel 209, seals the outlet body 204 from the inlet body 202, thereby preventing fluid flow from the inlet body 202 to the outlet body 204.

The choke valve body 206 defines an inner region 212 within the choke valve assembly 100. Fluids from the upstream flow line 102 can flow through portions of the inner region 212 to the downstream flow line 104. The choke valve assembly 100 includes a sleeve 210 positioned in and attached to the inner region 212. The sleeve 210 defines an inner sleeve region 214 internal to the sleeve 210 and an outer sleeve region 216 external to the sleeve 210 and internal to the inner region 212 of the choke valve body 206. The sleeve 210 can flow the fluids from the inlet body 202 through the inner sleeve region 214 instead of the outer sleeve region 216. In other words, the sleeve 210 is attached to the inner region 212 of the choke valve body 206 such that, when the choke valve assembly 100 is in an open state and is operating as intended, fluids from the inlet body 202 can only flow through the inner sleeve region 214, but not through the outer sleeve region 216.

In some implementations, the inner sleeve 210 is positioned in and attached to a portion of the choke valve body 206 that is attached to the outlet body 204. A portion of the inner sleeve 210 extends into the outlet body 204, for example, into the outlet trim of the choke valve assembly 100. By this arrangement, fluids can flow from the upstream flow line 102 into the choke valve body 206. Fluids exiting the choke valve body 206 are constrained to flow through the inner sleeve region 214, but not the outer sleeve region 216, toward the downstream flow line 104.

In certain implementations, the sleeve may be placed in the inlet trim instead of the outlet trim. In other implementations, two sleeves includes one sleeve at the inlet trim and the other sleeve at the outlet trim, respectively. In some instances, the pressure in the void area of the inlet trim can be sensed similarly to pressure sensing in the void area of the outlet trim. Lastly, while the inlet trim may be implemented, disposing the trim at the choke outlet portion may be beneficial because the trim would be generally exposed to higher fluid velocity at the outlet portion than at the inlet portion.

The sleeve 210 is fixedly and sealingly attached to the inner region 212 defined by the choke valve body 206 to prevent the fluids from flowing through the outer sleeve region 216. To do so, the choke valve assembly 100 includes a ring-seal 218 that affixes the sleeve to the inner region 212 and seals the outer sleeve region 216 from the rest of the inner region 212. Various structural features, locks, seals, etc. may attach the sleeve to the valve outlet trim and, in examples, some of these features if employed may be attached to and removable from the valve body. The mechanisms may create a seal that prevents fluid from flowing into the void space. In one example, a seal may be at the upstream end of the inlet or at other locations.

In some implementations, the sleeve 210 can be a tubular member that is concentric with the outer body 204. The sleeve 210 can be made of a material that can withstand (physically and chemically) the fluids flowed through the choke valve assembly 100. For example, the sleeve 210 can be made of tungsten carbide or high super duplex stainless steel material.

As described earlier, the choke valve assembly 100 is shown in a closed state in FIG. 2. That is, the hand wheel 209 has been turned to lower the valve stem 211 onto an end of the sleeve 210. The ring-seal 218 prevents fluids received through the inner body 202 from flowing to the outer body 204.

Figure 3:
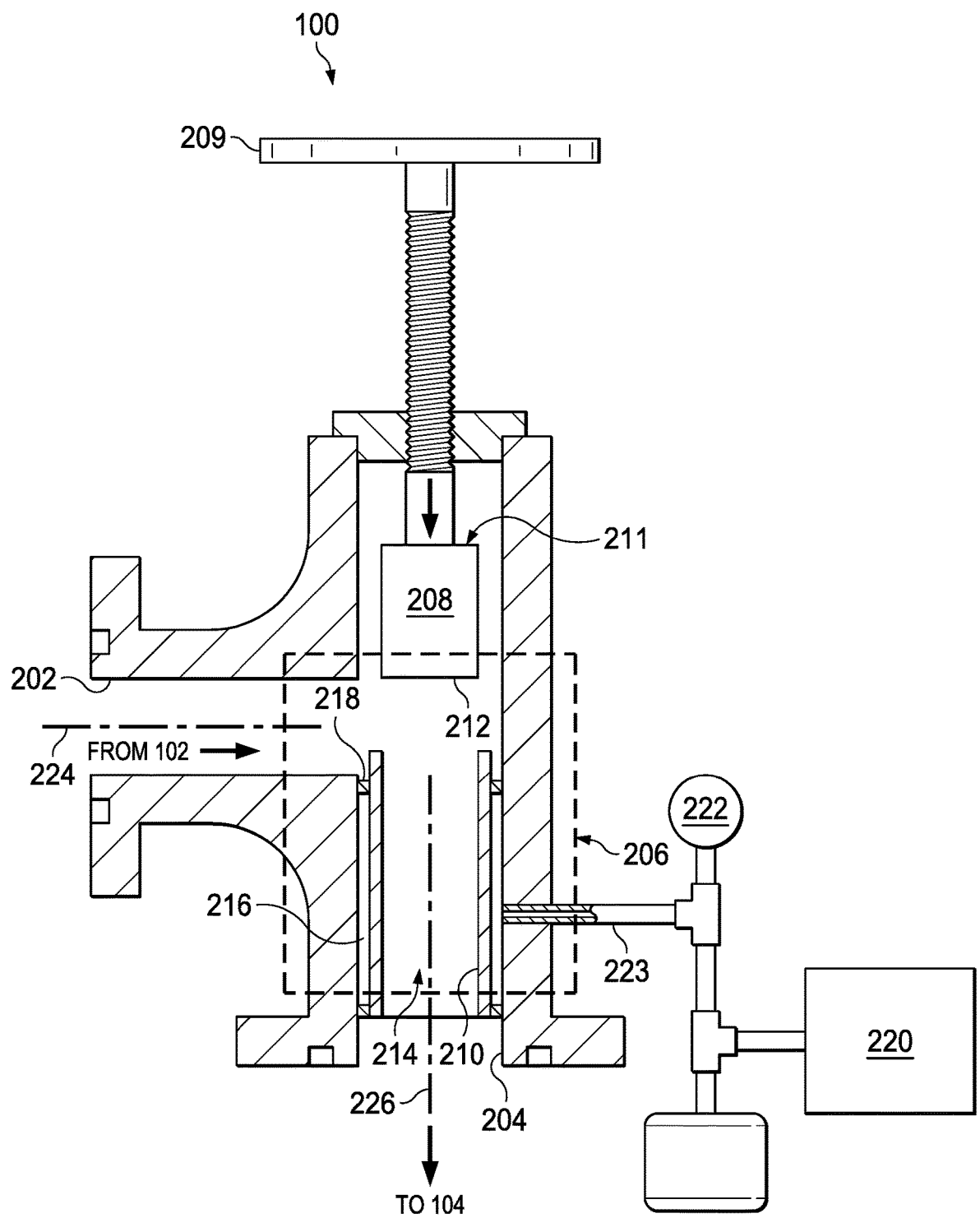
FIG. 3 is a schematic diagram of an example choke valve assembly in an open state.

FIG. 3 is a schematic diagram of an example choke valve assembly, for example, the choke valve assembly 100, in an open state. In the open state, the hand wheel 209 has been turned to raise the valve stem 211 away from the end of the sleeve 210. Fluids from the inner body 202 can flow through the choke valve body 206 towards the outer body 204. However, the ring-seal 218 forces the fluids to flow through the inner sleeve region 214 and seals the outer sleeve region 216 to the fluid flow. Any erosion or other damage that is caused by solid particulates or other components of the fluids is experienced by the inner surface of the sleeve 214 rather than the inner surface of the choke valve body 206 in the outer sleeve region 216. In this manner, the choke valve body 206 is protected even if the sleeve 210 is ruptured due to the erosion or damage.

Over time, as fluids flow through the choke valve assembly 100, the sleeve 210 is likely to be ruptured and damaged as explained above. To determine if the sleeve 210 has ruptured or has been damaged, a pressure sensor 222 can be connected to the void space defined by the outer sleeve region 216. For example, tubing 223 made from a fluidic pressure resistant material (such as stainless steel) can connect the void space defined by the outer sleeve region 216 to the pressure sensor 222. The pressure sensor 222 can sense a fluidic pressure in the void space, and, generate and transmit a signal representing the sensed fluidic pressure.

An ESD system 220 can be operatively coupled to the outer sleeve region 216 and to the pressure sensor 222. The ESD system 220 can be implemented as a computer-readable medium storing computer instructions executable by one or more computer processors to perform operations including shutting down flow through either the upstream flow line 102 or the downstream flow line 104 or both. Alternatively, the ESD system 220 can be implemented as processing circuitry, firmware, hardware, software or combinations of them to perform the operations. If the fluidic pressure in the void space defined by the outer sleeve region 216 fails to satisfy a fluidic pressure threshold, that is an indication that the sleeve 210 has failed. Upon such an occurrence, the ESD system 220 can shut down the flow through the upstream flow line 102 or the downstream flow line 104 or both to prevent leakage of the fluids out of the flow lines.

In some implementations, the ESD system 220 stores a fluidic pressure threshold, for example, 100 pounds per square inch (PSI). The ESD system 220 includes or is operatively coupled to a valve (for example, a solenoid valve or other valve). In operation, the ESD system 220 receives fluidic pressure sensed by the pressure sensor 222, for example, continuously, periodically (for instance, at a frequency of 1 pressure signal per second or other frequency) or upon the pressure sensor 222 sensing a pressure value greater than the fluidic pressure threshold. The ESD system 220 compares the fluidic pressure value represented by the pressure signal from the pressure sensor 222 to the stored fluidic pressure threshold. Upon determining that the sensed pressure fails to satisfy the fluidic pressure threshold (for example, is greater than the fluidic pressure threshold), the ESD system 220 activates the valve, such as a safety valve, to close the upstream flow line 102 (or the downstream flow line 104, or both) to which the ESD system 220 is fluidically coupled.

Figure 4:
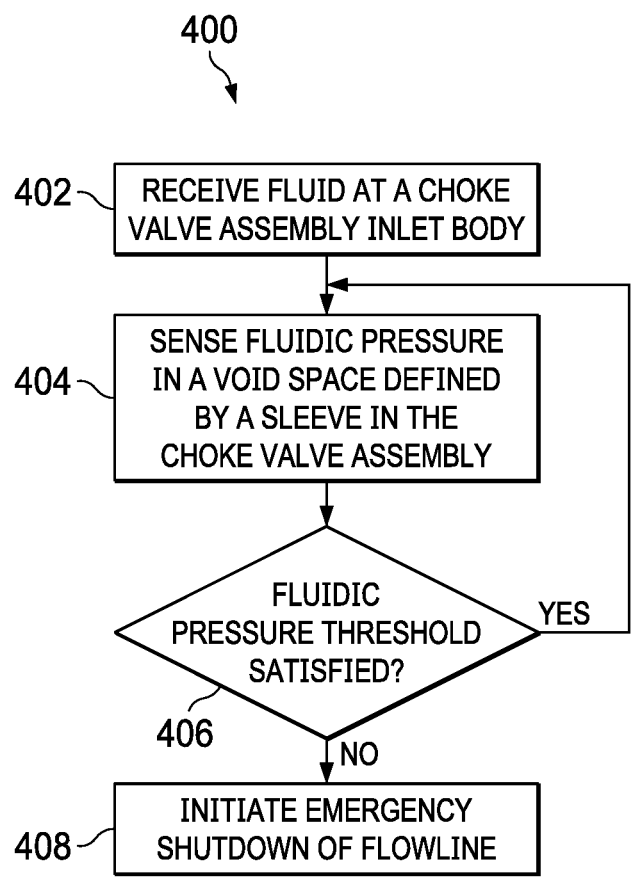
FIG. 4 is a flowchart of an example of a process of controlling fluid flow through flow lines.

FIG. 4 is a flowchart of an example of a process 400 of controlling fluid flow through flow lines. The process 400 can be implemented, in part, by a choke valve assembly such as the choke valve assembly 100 and, in part, by a ESD system such as the ESD system 220. At 402, fluid is received at a choke valve assembly inlet body. For example, fluids from an upstream flow line are received at the inlet body 202 of the choke valve assembly 100. At 404, fluidic pressure is sensed in a void space defined by a sleeve in the choke valve assembly. For example, the sleeve 210 positioned in and attached to the choke valve body 206 positioned between the inlet body 202 and the outlet body 204 forms a void space defined by the outer region 216 external to the sleeve 210 and internal to the choke valve body 206. At 406, a determination is made to check if a fluidic pressure threshold is satisfied. For example, the ESD system 220 checks if the pressure sensed by the pressure sensor 222 in the void space satisfies the fluidic pressure threshold stored by the ESD system 220. If the fluidic pressure is satisfied (decision branch "YES"), then the fluidic pressure is continued to be sensed by implementing step 404. If the fluidic pressure is not satisfied (decision branch "NO"), then, at 408, emergency shutdown of the flow line is initiated. For example, the ESD system 220 triggers a valve to shut down flow through the flow line to which the ESD system 220 is operatively coupled, which can be the upstream flow line 102 or the downstream flow line 104 or both.

In sum, some implementations of the subject matter described here are directed to a hydrocarbon flow line assembly. The assembly includes an upstream flow line, for example, the upstream flow line 102, to flow well fluids that include hydrocarbons extracted from a hydrocarbon reservoir in a subterranean zone. The assembly includes a choke valve assembly, for example, the choke valve assembly 100, downstream of the upstream flow line. The choke valve assembly is fluidically coupled to an outlet of the upstream flow line to receive the well fluids from the upstream flow line. The choke valve assembly includes a sleeve positioned in and attached to an inner region of the choke valve assembly. The sleeve defines an inner sleeve region internal to the sleeve and an outer sleeve region external to the sleeve and internal to the inner region of the choke valve assembly. The sleeve can flow the fluids from the inlet body through the inner sleeve region instead of the outer sleeve region. The assembly includes a downstream flow line, for example, the downstream flow line 104, downstream of the choke valve assembly that can receive the well fluids from an outlet of the choke valve assembly.

Thus, particular implementations of the subject matter have been described. Other implementations are within the scope of the following claims.

The invention claimed is:
1. A choke valve assembly comprising:
an inlet body configured to receive fluids flowed through an upstream flow line;

an outlet body fluidically coupled to the inlet body, the outlet body configured to discharge fluids received at the inlet body out of the choke valve assembly into a downstream flow line;

a choke valve body positioned between and attached to each of the inlet body and the outlet body, the choke valve body comprising a choke valve configured to be opened or closed to control flow of the fluids from the inlet body to the outlet body; and a sleeve positioned in an inner region defined by the choke valve body, wherein the sleeve is attached to the choke valve body via a seal and does not contact the choke valve body, the sleeve defining an inner sleeve region internal to the sleeve and an outer sleeve region comprising a volume external to the sleeve in the inner region defined by the choke valve body, the sleeve configured to flow the fluids from the inlet body through the inner sleeve region instead of through the outer sleeve region, wherein the outer sleeve region shares a longitudinal axis with the inner sleeve region.

2. The choke valve assembly of claim 1, wherein the sleeve is attached to a portion of the choke valve body that is attached to the outlet body, and wherein the outlet body shares the longitudinal axis with the outer sleeve region and the inner sleeve region.

3. The choke valve assembly of claim 2, wherein a portion of the sleeve extends into a region defined by the outlet body.

4. The choke valve assembly of claim 1, wherein the sleeve is sealingly attached to the choke valve body in the inner region defined by the choke valve body to prevent the fluids from flowing through the outer sleeve region, and wherein the outer sleeve region comprises an annulus between the sleeve and the choke valve body, the annulus sharing the longitudinal axis with the inner sleeve region.

5. The choke valve assembly of claim 4, wherein the seal comprises a first ring-seal and a second ring-seal each configured to sealingly attach the sleeve to the choke valve body in the inner region defined by the choke valve body, wherein the annulus comprises a continuous annulus from the first ring-seal to the second ring-seal.

6. The choke valve assembly of claim 1, wherein the seal comprises:

a first ring-seal that couples a first end portion of the sleeve to the choke valve body, wherein the outer sleeve region comprises an annulus between the sleeve and the choke valve body, the annulus sharing the longitudinal axis with the inner sleeve region; and a second ring-seal that couples a second end portion of the sleeve to the choke valve body or the outlet body, wherein the annulus comprises a continuous annulus from the first ring-seal to the second ring-seal, and wherein, to close, the choke valve is configured to seal against an end of the sleeve.

7. The choke valve assembly of claim 1, wherein the inner sleeve region is a flow path for the fluids, and wherein the outer sleeve region defines a void space and comprises an annulus between the sleeve and the choke valve body, the annulus sharing the longitudinal axis with the inner sleeve region.

8. The choke valve assembly of claim 7, further comprising an emergency shutdown system operatively coupled to the outer sleeve region and to either the upstream flow line or the downstream flow line, the emergency shutdown system configured to perform operations comprising shutting down flow through the upstream flow line or the downstream flow line to which the emergency shutdown system is operatively coupled in response to a fluidic pressure in the void space failing to satisfy a fluidic pressure threshold.

9. The choke valve assembly of claim 8, further comprising a pressure sensor operatively coupled to the outer sleeve region and to the emergency shutdown system, the pressure sensor configured to perform operations comprising:

sensing a fluidic pressure in the void space; and transmitting a signal to the emergency shutdown system, the signal representing the sensed fluidic pressure.

10. The choke valve assembly of claim 8, wherein a longitudinal axis of the inlet body is substantially perpendicular to a longitudinal axis of the outlet body, wherein the outer sleeve region comprises an annulus that shares the longitudinal axis of the outlet body, and wherein the emergency shutdown system is operatively coupled to the downstream flow line.

11. A method comprising:

receiving, from an upstream flow line, fluids at an inlet body of a choke valve assembly;

flowing the fluids from the inlet body through a choke valve body to an outlet body of the choke valve assembly, wherein a sleeve is positioned in the choke valve body positioned between the inlet body and the outlet body, wherein the sleeve is attached to the choke valve body via a seal and does not contact the choke valve body, wherein the sleeve defines an inner region internal to the sleeve and an outer region as a volume external to the sleeve and internal to the choke valve body, the outer region sharing a longitudinal axis with the inner region, the choke valve body comprising a choke valve configured to be open or closed to control flow of the fluids from the inlet body to the outlet body, and wherein flowing comprises flowing, by the sleeve and in response to the choke valve being open, the fluids received at the inlet body to the outlet body through the inner region instead of through the outer region; and discharging the fluids from the outlet body to a downstream flow line.

12. The method of claim 11, wherein the sleeve seals the outer region to fluid flow, wherein the outer region comprises an annulus between the sleeve and the choke valve body, the annulus sharing the longitudinal axis with the inner region, and wherein the choke valve seals the inner region to fluid flow when closed and opens the inner region to fluid flow when open.

13. The method of claim 11, further comprising:

sensing, by a pressure sensor fluidically coupled to the outer region, a fluidic pressure in the outer region responsive to fluid flow through the choke valve body;

transmitting, by the pressure sensor, a signal representing the sensed fluidic pressure to an emergency shutdown system fluidically coupled to either the upstream flow line or the downstream flow line;

determining, by the emergency shutdown system, that the sensed fluidic pressure fails to satisfy a fluidic pressure threshold; and in response to determining that the sensed fluidic pressure fails to satisfy a fluidic pressure threshold, shutting down flow through either the upstream flow line or the downstream flow line.

14. A hydrocarbon flow line assembly comprising:

an upstream flow line configured to flow well fluids comprising hydrocarbons extracted from a hydrocarbon reservoir in a subterranean zone;

a choke valve assembly downstream of the upstream flow line, the choke valve assembly fluidically coupled to an outlet of the upstream flow line to receive the well fluids from the upstream flow line, the choke valve assembly comprising a sleeve positioned in an inner region of the choke valve assembly, the sleeve defining an inner sleeve region internal to the sleeve and an outer sleeve region comprising a space, the outer sleeve region external to the sleeve in the inner region of the choke valve assembly, wherein the sleeve is attached to a choke valve body of the choke valve assembly via a seal and does not contact the choke valve body, the sleeve configured to flow the well fluids through the inner sleeve region instead of through the outer sleeve region, wherein the outer sleeve region shares a longitudinal axis with the inner sleeve region; and a downstream flow line downstream of the choke valve assembly and configured to receive the well fluids from the choke valve assembly.

15. The assembly of claim 14, wherein the choke valve assembly comprises the choke valve body positioned between and attached to each of an inlet body and an outlet body, the inlet body configured to receive the well fluids from the upstream flow line, the outlet body configured to receive the well fluids from the inlet body through the choke valve body, the choke valve body comprising a choke valve configured to be opened or closed to control flow of the well fluids from the inlet body to the outlet body, wherein the choke valve body defines the inner region in which the sleeve is positioned in, and wherein the outer sleeve region comprises an annulus between the sleeve and the choke valve body, the annulus sharing the longitudinal axis with the inner region.

16. The assembly of claim 15, wherein the outer sleeve region defines a void space, wherein the assembly further comprises an emergency shutdown system operatively coupled to the outer sleeve region and to either the upstream flow line or the downstream flow line, the emergency shutdown system configured to perform operations comprising shutting down flow through the upstream flow line or the downstream flow line to which the emergency shutdown system is operatively coupled in response to a fluidic pressure in the void space failing to satisfy a fluidic pressure threshold.

17. The assembly of claim 15, wherein the inner sleeve region is a flow path for the well fluids, wherein the sleeve is sealingly attached to the choke valve body to prevent the fluids from flowing through the outer sleeve region, and wherein the outlet body shares the longitudinal axis with the outer sleeve region and the inner sleeve region.

18. The assembly of claim 17, wherein the seal comprises a first ring-seal and a second ring-seal each configured to sealingly attach the sleeve to the choke valve body in the inner region defined by the choke valve body, wherein the annulus comprises a continuous annulus from the first ring-seal to the second ring-seal.

19. The assembly of claim 15, wherein the seal comprises:
a first ring-seal that couples a first end portion of the sleeve to the choke valve body, wherein the outer sleeve region comprises an annulus between the sleeve and the choke valve body, the annulus sharing the longitudinal axis with the inner sleeve region; and
a second ring-seal that couples a second end portion of the sleeve to the choke valve body or the outlet body, wherein the annulus comprises a continuous annulus from the first ring-seal to the second ring-seal, and wherein, to close, the choke valve is configured to seal against an end of the sleeve.

20. The assembly of claim 15, wherein the choke valve body is configured to change a flow path of the fluid received from the upstream flow line by substantially ninety degrees prior to flowing the fluid to the downstream flow line.

* * * * *